(12) United States Patent
Smith et al.

(10) Patent No.: US 6,591,871 B2
(45) Date of Patent: Jul. 15, 2003

(54) LOW PERMEATION POLYBUTYLENE TEREPHTHALATE AND POLYBUTYLENE NAPHTHALATE FUEL AND VAPOR TUBES

(75) Inventors: Christopher W. Smith, Lexington, TN (US); Alan L. Edmonson, Lexington, TN (US); Jeremy Duke, Lexington, TN (US); Jerry Shifman, Wildersville, TN (US); Jeffrey A. Swane, Christian County, MO (US)

(73) Assignee: Dayco Products, LLC, Miamsburg, OH (US)

( * ) Notice: Subject to any disclaimer, the term of this patent is extended or adjusted under 35 U.S.C. 154(b) by 21 days.

(21) Appl. No.: 09/951,181

(22) Filed: Sep. 13, 2001

(65) Prior Publication Data

US 2003/0047229 A1 Mar. 13, 2003

(51) Int. Cl.[7] .................................. F16L 11/04
(52) U.S. Cl. ..................... 138/137; 138/141; 138/147
(58) Field of Search .................. 138/109, 137, 138/138, 141, 147, 121; 428/36.91, 36.92

(56) References Cited

U.S. PATENT DOCUMENTS

| 3,838,713 | A | * | 10/1974 | Tubbs .................... 138/109 |
|---|---|---|---|---|
| 4,606,952 | A | | 8/1986 | Sugimoto et al. |
| 4,654,926 | A | * | 4/1987 | McCambridge .............. 15/328 |
| 5,390,705 | A | * | 2/1995 | Brunnhofer .................. 138/137 |
| 5,430,603 | A | | 7/1995 | Albino et al. |
| 5,472,746 | A | * | 12/1995 | Miyajima et al. ........... 138/109 |
| 5,474,109 | A | | 12/1995 | Stoeppelmann et al. |
| 5,570,711 | A | * | 11/1996 | Walsh ......................... 138/137 |
| 5,910,544 | A | | 6/1999 | Ozawa et al. |
| 5,996,642 | A | | 12/1999 | Noone et al. |
| 6,089,278 | A | * | 7/2000 | Nishino et al. ............. 138/137 |
| 6,179,008 | B1 | | 1/2001 | Kawazura et al. |
| 6,192,942 | B1 | * | 2/2001 | Hsich et al. ................. 138/137 |
| 6,263,920 | B1 | * | 7/2001 | Hsich et al. ................. 138/137 |
| 6,279,615 | B1 | * | 8/2001 | Iio et al. ...................... 138/137 |
| 6,321,794 | B1 | * | 11/2001 | Ishida et al. ................. 138/121 |
| 6,378,549 | B1 | * | 4/2002 | Zapp .......................... 138/109 |
| 2001/0031330 | A1 | * | 10/2001 | Ito et al. .................. 428/36.91 |
| 2001/0037795 | A1 | * | 11/2001 | Stieler ........................ 123/456 |

* cited by examiner

Primary Examiner—James Hook
(74) Attorney, Agent, or Firm—Joseph V. Tassone

(57) ABSTRACT

A tubular structure exhibiting fuel and vapor impermeability properties for use as a fuel transport hose, wherein the hose is constructed of a polyalkylene terephthalate material or a polyalkylene naphthalate material, wherein the polyalkylene terephthalate or the polyalklyene naphthalate material extends throughout the entire wall structure.

30 Claims, 1 Drawing Sheet

LOW PERMEATION POLYBUTYLENE TEREPHTHALATE AND POLYBUTYLENE NAPHTHALATE FUEL AND VAPOR TUBES

BACKGROUND OF THE INVENTION

The present invention relates to the field of polymeric tubes, and particularly to the field of flexible polymeric automobile fuel and vapor transmission tubes which have reduced permeability to fuel and vapor. More particularly, the present invention relates to polybutylene terephthalate (PBT) and polybutylene naphthalate (PBN) tubes and to the use of such tubes to reduce the amount of fuel vapor released to the atmosphere from motor vehicles.

Recent environmental regulations imposed on the automotive industry and on the fuel delivery industries severely limit the amount of fuel vapor that can permeate from the fuel system of motor vehicles and from the fuel delivery hoses used to transport such fuels. It is anticipated that in some states such as California, future federal and state regulation will fix the limit for permissible hydrocarbon emissions at a maximum of 0.5 grams/per vehicle of fuel vapor emission per 24 hours period with the engine not running (S.H.E.D. TEST). Such emissions measured are those vapor emissions permeating from the fuel hose and any other parts of the fuel supply system.

Choosing the right combination of materials used in the construction of fuel transport tubes, such as fuel filler tubes, to provide high performance, long service life, and low permeability of fuel and vapor in the tube, while maintaining manufacturing costs at an acceptable level, has been more difficult than ever before.

Various types of tubing have been proposed to address these concerns. In general, the most successful tubes have been co-extruded multi-layer tubes which employ a relatively thick outer layer composed of a material which is resistant to the external environment while the inner layer is generally thinner and is composed of a material which is chosen for its ability to prevent permeation of fuel liquid and vapor.

Typically, fuel transfer hoses, in the past, have been constructed of natural or synthetic rubber material such as butadiene-acrylonitrile rubber or the like. Other hoses have been constructed using a fluoroelastomer as an inner wall surface layer of the hose and some other material as the outer layer. Such hoses have a high permeability to fuel vapor. Attempts to produce fuel transport hoses with reduced permeability to fuel vapors have included the use of corrugated polyamide and fluorocarbon thermoplastic tubes. However, these structures are presently considered to be only marginally effective to reduce the permeability of fuel vapors while being relatively expensive.

Other attempts to produce a fuel tube with reduced permeability to fuel vapors use a tetrafluoroethylene-hexafluoropropylene-vinylidine fluoride terpolymer liner and a layer of hexafluoropropylene-vinylidine fluoride copolymer or other suitable elastomer as the conductive inner part of the tube. For example, such hoses are discussed in U.S. Pat. No. 4,606,952 to Sugimoto and U.S. Pat. No. 5,430,603 to Albino et al. Such hose structures, though, have a tendency to wrinkle on the inner radius of the forming mandrel or pin causing an undesirable and discernable defect which may also exhibit a weakened area in the hose.

Polybutylene terephthalate has been used as a thin barrier layer in multilayer hoses or tubes as disclosed in U.S. Pat. Nos. 5,996,642; 5,910,544; and 5,474,109. Other examples of prior art patents which teach multilayer polymer hoses or tubes containing polybutylene terephthalate in one of the layers include U.S. Pat. No. 6,192,942 to Hsich et al. which teaches a multi-layer assembly for use in fuel line applications, wherein the multiphase polymer may be polybutylene terephthalate and U.S. Pat. No. 6,179,008 to Kawazura, et al. which teaches rubber hoses composed of an inner tube of polybutylene terephthalate.

It is clear that there have been many problems and many proposed solutions to said problems. However, there remains an urgent need, particularly in the automotive and fuel delivery industries for a fuel hose which prevents permeation of fuels and vapor and which resists delamination under stress over long periods of time while maintaining manufacturing costs at an acceptable level.

SUMMARY OF THE INVENTION

The present invention provides fuel tubes for use in fuel systems which not only drastically reduces or prevents permeation of fuel vapor into the environment but also eliminates the problem of delamination of the various layers of materials, particularly barrier materials such as PVDF, THV, PTFE, ETFE, etc. used in the construction of such tubes. Since the permeation rate of fuel vapor through a hose wall is inversely proportional to the thickness of the hose wall, it has been found that certain materials having sufficient barrier properties can be used to form the hose wall without the need for a separate barrier layer. However, such material must also be flexible, possess superior strength and durability, and be resistant to degradation by the fuel.

In accordance with the present invention, polyalkylene terephthalate or polyalkylene naphthalate, and preferably a polyalkylene terephthalate, or polyalkylene naphthalate in which the alkylene component contains 1 to about 6 carbon atoms, has the above characteristics. In a preferred aspect of the invention the polyalkylene terephthalate is polybutylene terephthalate (PBT) and the polyalkylene napthalate is polybutylene napthalate (PBN). The invention particularly relates to fuel transport hoses, wherein polybutylene terephthalate or polybutylene naphthalate is employed throughout the entire wall of the hose to provide reduced permeability without the need for a separate barrier layer. Typically, the polybutylene terephthalate or or polybutylene naphthalate hose of the present invention exhibits a fuel liquid and vapor permeation of less than about 1 $g/m^2/day$ of CE-10 at 40° C. In addition to reduced permeability, the hose of the present invention has adequate strength and durability over long periods of time, and is resistant to chemical degradation by the fluids being transported therein.

Polybutylene terephthalate is a relatively stiff material, but is considered adequate for the purpose of this invention. In certain situations where more flexibility is desired, the polybutylene terephthalate can be built having a corrugated structure which allows additional flexibility depending upon the extent and degree of the corrugation and upon the particular use of the hose.

Typically, fuel transport hoses require that at least the inner surface of the hose is conductive to dissipate any static buildup that may occur. Accordingly, the polybutylene terephthalate may contain a conductive agent in an amount to prevent static discharge. Typically, the conductive agent is carbon black, but may be any conductive agent or combination of conductive agents commonly recognized in the industry to provide conductivity to a rubber or plastic material.

DETAILED DESCRIPTION OF THE INVENTION

In accordance with the present invention, polybutylene terephthalate or polybutylene naphthalate is employed as the sole material used to form the wall structure of a fuel and vapor impermeable tube for use as a fuel transport hose. Polybutylene terephthalate previously has been used as a thin barrier layer in multilayer tubes, but has not been used as the sole material throughout the entire tube wall. The permeation rate through a material is inversely proportional to the thickness of the material. Accordingly, it has now been found that the use of polybutylene terephthalate or polybutylene naphthalate as the sole material to form the wall of a fuel transport hose greatly reduces the permeation of fuel and vapor through the hose wall.

Polybutylene terephthalate and polybutylene naphthalate are relatively stiff materials and are generally not a good choice as a material for forming a tube which includes bends and turns such as required for forming fuel filler tubes, particularly, in the automotive industry. In one aspect of the invention, the polybutylene terephthalate or polybutylene naphthalate tube is formed having a corrugated configuration which makes the tube flexible enough so that it can be shaped in any configuration desired.

Figure 1:
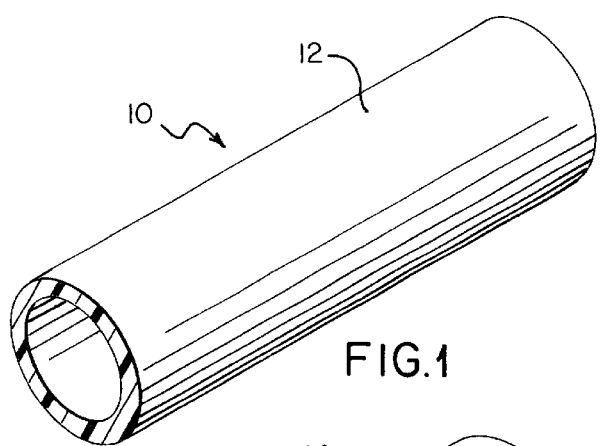
FIG. 1 is a perspective view illustrating a polybutylene terephthalate or a polybutylene naphthalate tube of the present invention.
Figure 4:
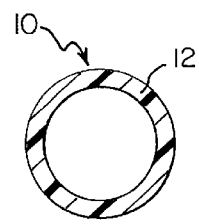
FIG. 4 is a sectional view through the polybutylene terephthalate or polybutylene naphthalate hose of FIG. 1.
Figure 2:
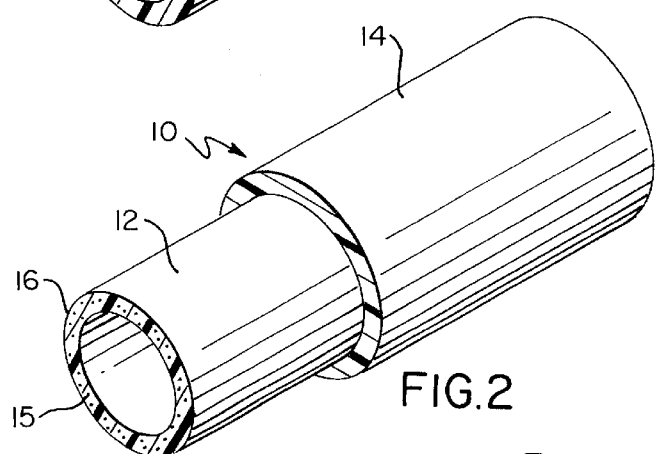
FIG. 2 is a perspective view illustrating the polybutylene terephthalate or polybutylene naphthalate hose of FIG. 1 including a protective cover.
Figure 5:
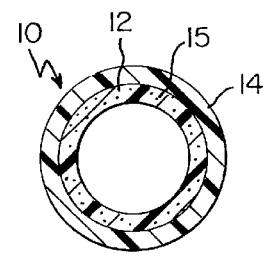
FIG. 5 is a sectional view through the polybutylene terephthalate or polybutylene naphthalate hose of FIG. 2.
Figure 3:
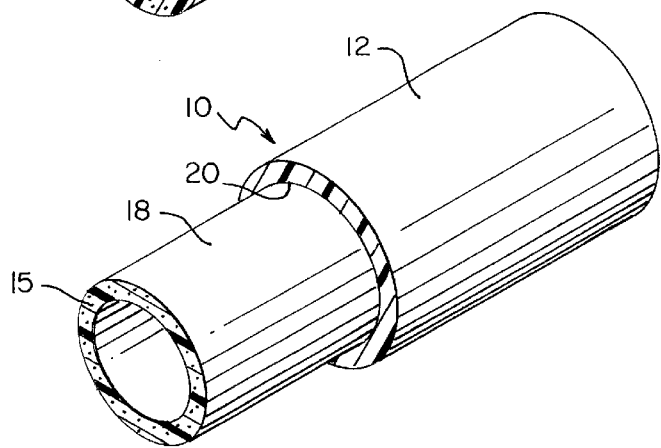
FIG. 3 is a perspective view illustrating the polybutylene terephthalate or polybutylene naphthalate hose of FIG. 1 including an inner conductive polybutylene terephthalate or polybutylene naphthalate layer.
Figure 6:
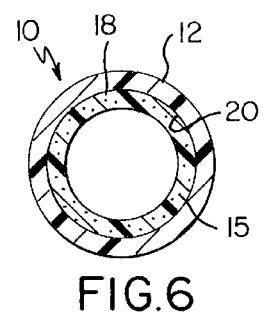
FIG. 6 is a sectional view through the polybutylene terephthalate or polybutylene naphthalate hose of FIG. 3.

With reference to the figures, FIGS. 1 and 4 illustrate one embodiment of the present invention wherein the entire wall 12 of the hose 10 is constructed of polybutylene terephthalate or polybutylene naphthalate. FIGS. 2 and 5 illustrate another embodiment of the invention wherein the entire wall 12 of the tube 10 is constructed of a polybutylene terephthalate or polybutylene naphthalate and the hose 10 further includes a cover 14 adjacent the outside surface 16 of the polybutylene terephthalate or polybutylene naphthalate wall 12. The cover 14 may be made of any material commonly used in the industry to cover a fuel tube and to provide flame resistance to the tube. Typically, the cover layer is constructed of a polymer, copolymer, blend or alloy of a thermoplastic material such as polyesters, polyamides such as nylons, polyurethanes, polyvinyl chloride, polyolefins, cholrinated polylefins, polybutylene terephthalate, polyethylene terephthalate, polyalkylene naphthalates, and the like. FIGS. 3 and 6 illustrate still another embodiment of the invention wherein the hose 10 further includes an inner layer or tubular structure 18 of polybutylene terephthalate or polybutylene naphthalate adjacent the inner surface 20 of the polybutylene terephthalate or polybutylene naphthalate wall 12. Typically, the polybutylene terephthalate or polybutylene naphthalate inner layer 18 is made conductive by the addition of a conductive agent 15. In an alternate embodiment of the invention (see FIGS. 2 and 5), the polybutylene terephthalate wall structure 12 contains the conductive agent, in which case, the inner tubular layer 18 is not required. In this embodiment, the conductive material may be dispersed throughout the polybutylene terephthalate or polybutylene naphthalate wall or it may be concentrated near the inner surface of the inner layer 18. The conductive agent can be any of the commonly used conductive agents in the industry such as elemental carbon; conductive metal particles such as iron, copper, silver, gold, nickel, and the like; and mixtures and alloys thereof. Elemental carbon, commonly referred to in the industry as carbon black, has been found to be effective in providing sufficient electrostatic dissipation and, therefore, is the preferred conductive agent for most applications in accordance with the present invention.

It may be desirable to incorporate a tie layer between the polybutylene terephthalate or polybutylene naphthalate tube and the cover, or between the conductive polybutylene terephthalate or polybutylene naphthalate layer and the non-conductive polybutylene terephthalate or polybutylene naphthalate layer. Where such tie layer is desired, any of the commonly recognized tie layers which will adhere to the polybutylene terephthalate or polybutylene naphthalate, and to the cover material will be satisfactory. Anhydride-modified linear low density polyethylenes available from Du Pont under the name Bynel®, or from Mitsui under the name Admer® are examples of two such materials.

The polybutylene terephthalate hose of the invention, typically, is used as an automotive fill tube, wherein the fill tube is connected to a conductive polybutylene terephthalate fuel filler funnel. The conductive agent used to dissipate static buildup in the hose is also used to provide conductive characteristic to the fuel fill funnel. Typically, one end of the fill tube is connected to the funnel by conventional means, e.g., by spin welding one end of the fill tube to the fuel fill funnel. Connecting one end of the fill tube to the fuel fill funnel eliminates a joint which might be prone to leaks.

The other end of the fill tube is connected to a conductive elastomeric hose by end-forming the end of the polybutylene terephthalate fill tube using a conductive metal or conductive plastic insert. The end forming of the polybutylene terephthalate fill tube is accomplished by conventional means, and the end-formed end of the fill tube containing the insert is extended into the open end of the conductive elastomeric hose wherein the conductive fill tube and the conductive elastomeric hose are connected using a metal band or clamp.

Conductive polybutylene terephthalate hoses having a non-conductive cover manufactured in accordance with the present invention exhibited permeation of CE-10 (an industry wide accepted fuel containing 10% ethanol) at 40° C. of less than 1 $g/m^2/day$. The hoses also passed low temperature impact.

Having described the invention in detail and by reference to preferred embodiments thereof, it will be apparent that modifications and variations are possible without departing from the scope of the invention defined in the appended claims.

What is claimed is:

1. A tubular structure exhibiting fuel and vapor impermeability properties for use as a fuel transport tube, wherein said tubular structure has a first end connected to a conductive fuel filler funnel, said tubular structure having a polybutylene terephthalate or polybutylene naphthalate wall structure, wherein said polybutylene terephthalate or said polybutylene naphthalate extends throughout the entire wall structure, and said fuel filler funnel is a polybutylene terephthalate or polybutylene naphthalate fuel filler funnel.

2. The tubular structure of claim 1, wherein said terephthalate or said polybutylene naphthalate wall structure contains a conductive agent to dissipate static buildup in said tubular structure.

3. The tubular structure of claim 2 wherein said conductive agent is (1) elemental carbon, or (2) a metal selected from the group consisting of iron, copper, silver, gold, nickel, and mixtures and alloys thereof.

4. The tubular structure of claim 3, wherein said conductive agent is elemental carbon.

5. The tubular structure of claim 3, wherein said conductive agent is dispersed in said polybutylene terephthalate or said polybutylene naphthalate wall structure.

6. The tubular structure of claim 3, wherein said conductive agent is concentrated adjacent the inner surface of said polybutylene terephthalate or said polybutylene naphthalate wall structure.

7. The tubular structure of claim 1, wherein said polybutylene terephthalate or polybutylene naphthalate wall structure comprises an inner conductive layer of polybutylene terephthalate or polybutylene naphthalate and an outer non-conductive layer of polybutylene terephthalate or polybutylene naphthalate.

8. The tubular structure of claim 7, wherein said tubular structure further includes a protective cover.

9. The tubular structure of claim 8, wherein said protective cover is selected from the group consisting of polyesters, polyamides, polyurethanes, polyvinyl chloride, polyolefins, cholrinated polylefins, polybutylene terephthalate, polyethylene terephthalate, and polyalkylene naphthalates.

10. The tubular structure of claim 9, wherein said protective cover is a chlorinated polyolefin.

11. The tubular structure of claim 10, wherein said protective cover is chlorinated polyethylene.

12. The tubular structure of claim 1 wherein said tubular structure is corrugated to provide a flexible structure.

13. The tubular structure of claim 1, wherein said tubular structure is composed of polybutylene terephthalate and said fuel filler funnel is a polybutylene terephthalate fuel filler funnel.

14. The tubular structure of claim 13 wherein said polybutylene terephthalate tubular structure is spin welded to said polybutylene terephthalate fuel filler funnel.

15. The tubular structure of claim 14, wherein a second end of said polybutylene terephthalate tubular structure is connected to an elastomeric hose.

16. The tubular structure of claim 15, wherein a conductive insert is used to connect said polybutylene terephthalate tubular structure to said elastomeric hose.

17. The tubular structure of claim 16, wherein said insert is made of metal or plastic.

18. The tubular structure of claim 16, further including a crimped metal band or clamp to secure said polybutylene terephthalate tubular structure to said elastomeric hose.

19. The tubular structure of claim 1, wherein said tubular structure is composed of polybutylene naphthalate and said fuel filler funnel is a polybutylene naphthalate fuel filler funnel.

20. The tubular structure of claim 19 wherein said polybutylene naphthalate tubular structure is spin welded to said polybutylene naphthalate fuel filler funnel.

21. The tubular structure of claim 20, wherein a second end of said polybutylene naphthalate tubular structure is connected to an elastomeric hose.

22. The tubular structure of claim 21, wherein a conductive insert is used to connect said polybutylene naphthalate tubular structure to said elastomeric hose.

23. The tubular structure of claim 22, wherein said insert is made of metal or plastic.

24. The tubular structure of claim 22, further including a crimped metal band or clamp to secure said polybutylene naphthalate tubular structure to said elastomeric hose.

25. A tubular structure exhibiting fuel and vapor impermeability properties for use as a fuel transport tube, said tubular structure having a wall structure comprising an inner conductive polybutylene terephthalate layer containing elemental carbon as a conducting agent, and an outer non-conductive polybutylene terephthalate layer, wherein a first end of said tubular structure is spin welded to a conductive fuel filler funnel, and a second end of said tubular structure is connected to an elastomeric hose using a conductive metal or plastic insert, said second end of said tubular structure further including a crimped or clamped metal band to secure said second end of said tubular structure to said elastomeric hose.

26. A tubular structure exhibiting fuel and vapor impermeability properties for use as a fuel transport tube, said tubular structure having a wall structure comprising an inner conductive polybutylene naphthalate layer containing elemental carbon as a conducting agent, and an outer non-conductive polybutylene naphthalate layer, wherein a first end of said tubular structure is spin welded to a conductive fuel filler funnel, and a second end of said tubular structure is connected to an elastomeric hose using a conductive metal or plastic insert, said second end of said tubular structure further including a crimped or clamped metal band to secure said second end of said tubular structure to said elastomeric hose.

27. In a tubular structure exhibiting fuel and vapor impermeability properties for use as a fuel transport hose, the improvement wherein said tubular structure has a wall structure comprising an inner conductive polybutylene terephthalate layer containing elemental carbon as a conducting agent, and an outer non-conductive polybutylene terephthalate layer, wherein a first end of said tubular structure is spin welded to a conductive fuel filler funnel, and a second end of said tubular structure is connected to an elastomeric hose using a conductive metal or plastic insert, said second end of said tubular structure further including a crimped or clamped metal band to secure said second end of said tubular structure to said elastomeric hose.

28. The tubular structure of claim 27 wherein said conductive fuel filler funnel is a conductive polybutylene terephthalate fuel filler funnel.

29. In a tubular structure exhibiting fuel and vapor impermeability properties for use as a fuel transport hose, the improvement wherein said tubular structure has a wall structure comprising an inner conductive polybutylene naphthalate layer containing elemental carbon as a conducting agent, and an outer non-conductive polybutylene naphthalate layer, wherein a first end of said tubular structure is spin welded to a conductive fuel filler funnel, and a second end of said tubular structure is connected to an elastomeric hose using a conductive metal or plastic insert, said second end of said tubular structure further including a crimped or clamped metal band to secure said second end of said tubular structure to said elastomeric hose.

30. The tubular structure of claim 29 wherein said conductive fuel filler funnel is a conductive polybutylene naphthalate fuel filler funnel.

* * * * *